Patented Mar. 8, 1932

1,848,934

UNITED STATES PATENT OFFICE

GERALD OTLEY CASE, OF SEVENOAKS, ENGLAND

PRODUCTION OF HYDRAULIC CEMENT

No Drawing. Application filed December 9, 1930, Serial No. 501,161, and in Great Britain September 26, 1929.

This invention relates to the production of hydraulic cement.

It has heretofore been proposed to manufacture a Portland cement in two stages, that is to say, to form a nucleus by the combination under a white heat of Medway blue clay or equivalent aluminous compound with chalk or limestone in or about the proportions of one part of clay to five parts of chalk or limestone and to complete the manufacture by mixing the nucleus compound with uncalcined chalk or limestone, in or about the proportions of three parts of nucleus to one part of chalk or limestone.

The object of the present invention is to provide a further means of manufacturing a cheap and strong mortar or cement.

A method of manufacturing hydraulic cement according to the invention, consists in mixing ground calcium carbonate with a clinker derived from burning a mixture of calcium carbonate and aluminum silicate, said clinker being ground to British Portland cement standard of fineness, and the added carbonate being ground to a degree of fineness not greater than that to which the clinker is ground and not sufficiently coarse to leave any appreciable residue on a 76 mesh per inch sieve, while the proportion of calcium carbonate to free calcium oxide in the clinker is such as to give in the mixture a ratio by weight of pure carbonate ($CaCO_3$) to free calcium oxide of approximately 8:1.

By the term "free calcium oxide" is meant the calcium oxide which is contained in the tri-calcium silicate in the Portland cement clinker, and which is freed on the addition of water. Normally when water is added to Portland cement clinker, the calcium oxide is liberated and combines with the water to form calcium hydroxide. This reaction produces considerable heat and causes undesirable cracking of the cement. Normally, in Portland cement, this free calcium oxide amounts to 5-12% of the cement. If calcium carbonate is added to the cement clinker in proportions according to the invention, the calcium oxide which is freed on addition of water combines both with the carbonate and the water to form calcium hydroxy carbonate without the liberation of a detrimental amount of heat. It is intended throughout this specification that the term "free lime" or "free calcium oxide" shall mean calcium oxide which, on the addition of water, is liberated from the tri-calcium silicate present in the cement.

The clinker may be derived from calcareous material and argillaceous material (e. g. clay, shale or slag) or any other silica and alumina bearing materials (e. g. blast furnace slag or the like) which have been burned at a clinkering temperature i. e. about 1400° C. to form said clinker.

Preferably, the proportions are so adjusted that the ratio of calcium carbonate to aluminium silicate and free silica used in forming the clinker is such as to give a ratio by weight of carbonate to silicate and free silica of approximately 3:1 i. e. the raw material for the clinker preferably contains about 75% of calcium carbonate and 25% of aluminium silicate and free silica.

The clinker material required for the invention differs in no way from the ordinary Portland cement clinker, since, to form this clinker, a 3:1 mixture of carbonate to silicate and free silica may be used, and the kiln need only be at the usual temperature for forming Portland cement clinker, that is to say, about 1400° C. It is unnecessary, in forming the clinker required for the invention, to use temperatures above this, provided the proportions 3:1 of carbonate to silicate are used.

The calcium carbonate and aluminium silicate are burned together at clinkering heat until a clinker is formed and then the aforesaid proportion of calcium carbonate e. g. natural limestone rock, is added to the clinker, and a cementitious mixture formed by grinding them together.

Preferably, the calcium carbonate and the clinker material are mixed by grinding them together to a fine powder.

The amount of carbonate to be added varies from 20% to about 88% of the cement clinker content dependent on the purity of the lime-stone rock, the free calcium oxide content of the clinker, and the strength and plasticity which is required in the resulting cement. The strongest result is obtained by adding to 100 parts of cement clinker about 7½ parts by weight of calcium carbonate for every 1 part by weight of calcium oxide in the clinker. If, for example the cement clinker contains 88 parts combined calcium oxide and aluminium silicate and free silica and 12 parts free lime (CaO) then having added 88 parts of carbonate ($CaCO_3$), the final product is approximately 6 per cent free lime (CaO), 47 per cent calcium carbonate, and 47 per cent combined calcium oxide and aluminium silicate.

In cases, such as for plastering, where great strength is not required, but plasticity is important, a larger percentage of calcium carbonate may be added.

A preferred form of material is that in which the ground down mixture leaves not more than 10% residue on a 180 x 180 sieve or 1% on a 76 x 76 sieve.

Although calcium carbonate and natural limestone rock are the preferred materials for use in the production of a hydraulic cement, according to the invention, any natural rock containing a large percentage of calcium carbonate may be employed.

It has been found in practice that a ground mixture comprising the clinker and 50% of calcium carbonate when tested according to the British standard specification for tensile strength of neat Portland cement, has a resulting strength at seven days after gauging, of approximately 600 lbs. per square inch. If 85% of calcium carbonate is added to the clinker, and the cement is subject to the test it has a resulting tensile strength of about 250 lbs. per square inch.

In one form of carrying the invention into effect, cement clinker (made by intimately mixing together calcareous and argillaceous or other silica and alumina bearing materials, and burning them to a clinkering temperature) is obtained, and the amount of free lime in the clinker is ascertained. Supposing the free lime (CaO) is found to be 12 per cent, then to the 88 parts combined calcium oxide and aluminous silicate and 12 parts free lime, 88 parts of calcium carbonate in lump form is added. The cement clinker and added calcium carbonate are then ground together so that the residue on a 180 x 180 sieve does not exceed 10%.

If a cement clinker is used which is found to contain only 6 per cent of free lime (CaO) then to the 94 parts combined calcium oxide and aluminium silicate and 6 parts free lime, 44 parts of calcium carbonate is added, i. e. about 33% of the mixture, and the mixture ground as before.

Any known aggregate, such as small stones, sand fibre or the like, can be added to the cement. Such aggregate, however, must be added after the materials have been ground, since, if the aggregate is added to the materials before grinding, the resulting product will be useless as cement.

Where great strength is not required as in a mortar but a high degree of plasticity, for use as a plastering material, calcium carbonate in excess may be added to the clinker before grinding, e. g. may be increased to an amount equivalent to about 85% of the total material.

If it is desired to produce a slow setting cement a suitable quantity of any well known retarder of Portland cement, such as potassium dichromate, boric acid, borax sodium sulphate, potassium sulphate or calcium sulphate, or the like may be added to the mixture of cement clinker and calcium or other carbonate before grinding.

An apparatus for carrying the invention into effect may comprise one conveyor system carrying limestone rock, and another system carrying aluminium silicate and free silica to a mixer, and after mixing, another conveyor system carrying the mixture to a kiln to produce the clinker, which is carried in turn to a grinding mill, the ground clinker passing to a mixing chamber where it is mixed with calcium carbonate which has been ground in a second grinding mill.

The separate grinding mills may be employed in order that accurate proportions of the materials may pass to the mixing chamber, though if desired, the product of the kiln and the added limestone rock may be ground in the same mill and if not then sufficiently mixed the ground material may be fed to a mixer. Mixers employed according to the invention may be of the type used for intimately mixing fine materials.

The manufacture of a hydraulic cement according to the invention obtains a quick setting strong cementitious mixture, which is cheaper to produce than the ordinary Portland cement.

It is to be understood that the success of the process according to the invention depends upon the fulfillment of the conditions (a) the amount of carbonate which is added must be such as to give to the mixture a ratio by weight of pure carbonate to calcium oxide of approximately 8:1, otherwise there will either be an excess of carbonate in the cement which will remain uncombined, or some of the freed lime will combine directly with the water to form calcium hydrate; (b) the cement clinker must be ground to ordinary British Portland cement standard of fineness, that is to say, such as to leave a residue of not more than 10% upon an 180 mesh sieve; and (c) the carbonate must not be ground finer than the cement clinker. Unless these three conditions are complied with, poor results will be obtained and the product will be of a weak nature.

What I claim is:—

1. A method of manufacturing hydraulic cement consisting in mixing ground calcium carbonate with a clinker derived from burning a mixture of calcium carbonate and aluminum silicate, said clinker being ground to British Portland cement standard of fineness, and the added carbonate being ground to a degree of fineness not greater than that to which the clinker is ground and not sufficiently coarse to leave any appreciable residue on a 76 mesh per inch sieve, while the proportion of calcium carbonate to the amount of calcium oxide which, on the addition of water, is liberated from the tri-calcium silicate in the clinker, is such as to give in the mixture a ratio by weight of pure calcium carbonate ($CaCO_3$) to such liberated calcium oxide of approximately 8:1.

2. A method of manufacturing hydraulic cement according to claim 1, wherein the proportions of calcareous and argillaceous materials used in forming the clinker are so adjusted that the proportion of calcium carbonate to aluminum silicate and free silica is such as to give a ratio by weight of carbonate to silicate and free silica of approximately 3:1 in the clinker.

3. A method of manufacturing hydraulic cement consisting in mixing by grinding together to British Portland cement standard of fineness, calcium carbonate and a clinker material derived from burning a mixture of calcium carbonate and aluminum silicate the proportion of calcium carbonate in the mixture to the amount of calcium oxide, which, on the addition of water, is liberated from the tri-calcium silicate in the clinker, being such as to give to the mixture a ratio by weight of pure calcium carbonate ($CaCO_3$) to such liberated oxide of approximately 8:1.

4. A method of manufacturing hydraulic cement consisting in mixing by grinding together to British Portland cement standard of fineness, limestone with a clinker derived from burning a 3:1 mixture of calcium carbonate and aluminum silicate, the proportion of limestone to the amount of calcium oxide which, on the addition of water, is liberated from the tri-calcium silicate in the clinker, being such as to give to the mixture a ratio by weight of pure calcium carbonate ($CaCO_3$) to such liberated oxide of approximately 8:1.

5. A method of manufacturing hydraulic cement consisting in mixing, by grinding together to British Portland cement standard of fineness, calcium carbonate and a clinker material derived from burning a mixture of calcium carbonate and aluminium silicate, the proportion of added calcium carbonate being 20–88% of the clinker content.

6. A method of manufacturing hydraulic cement consisting in mixing, by grinding together to British Portland cement standard of fineness, limestone with a clinker derived from burning a 3:1 mixture of calcium carbonate and aluminium silicate, the proportion of added calcium carbonate being 20–88% of the clinker content.

7. Hydraulic cement formed of finely powdered mixture of calcium carbonate and Portland cement clinker in the proportion of 8 parts of calcium carbonate to 1 of calcium oxide which, on the addition of water, is liberated from the tri-calcium silicate in the clinker, said clinker having a British Portland cement standard of fineness and the calcium carbonate having a fineness not greater than that of the clinker.

8. Hydraulic cement according to claim 7 comprising a powdered clinker including about 12% calcium oxide which, on the addition of water, is liberated from the tri-calcium silicate in the clinker, and powdered calcium carbonate in the proportion of about 47% of the mixed material, said clinker having a British Portland cement standard of fineness and the calcium carbonate having a fineness not greater than that of the clinker.

9. Hydraulic cement formed of finely powdered mixture of calcium carbonate and Portland cement clinker in the proportion of about 6% calcium oxide which, on the addition of water, is liberated from the tri-calcium silicate in the clinker, and 33% finely powdered calcium carbonate in the mixture, said clinker having a British Portland cement standard of fineness and the calcium carbonate having a fineness not greater than that of the clinker.

10. Hydraulic cement formed of a finely powdered mixture of limestone and Portland cement clinker in the proportion by weight of 8 of limestone to 1 of calcium oxide which, on the addition of water, is liberated from the tri-calcium silicate in the clinker, said clinker having a British Portland cement standard of fineness and the calcium carbonate having a fineness not greater than that of the clinker.

In testimony whereof I affix my signature.

GERALD OTLEY CASE.